United States Patent [19]

Paloian

[11] 4,419,842
[45] Dec. 13, 1983

[54] HYDROPONIC PLANTER

[76] Inventor: Michael Paloian, 7 East Ct., Babylon Village, N.Y. 11702

[21] Appl. No.: 346,416

[22] Filed: Feb. 8, 1982

[51] Int. Cl.³ .............................................. A01G 31/00
[52] U.S. Cl. .......................................... 47/62; 47/59; 47/61
[58] Field of Search ................... 47/59, 60, 61, 62, 63, 47/64, 65

[56] References Cited

U.S. PATENT DOCUMENTS

| | | | |
|---|---|---|---|
| 2,486,512 | 11/1949 | Armstrong | 47/62 |
| 2,983,076 | 5/1961 | Merrill | 47/62 |
| 3,451,162 | 6/1969 | Rasmussen | 47/62 |
| 3,926,143 | 12/1975 | Hothan | 47/59 |

Primary Examiner—Robert A. Hafer
Assistant Examiner—Bradley M. Lewis
Attorney, Agent, or Firm—Allison C. Collard; Thomas M. Galgano

[57] ABSTRACT

A hydroponic device includes a hollow housing which defines a substantially closed lower chamber for receiving a liquid nutrient solution and a top open-ended upper chamber for receiving an inert filler material and the desired vegetation which are separated by a partition wall. At least one nutrient supply pipe is coupled to the partition wall and extends downwardly into the lower chamber. The supply pipe has a throughput bore extending therethrough to establish fluid communication between the upper chamber and the lower chamber, whereby the nutrient solution may be fed in a continuous cycle from the lower chamber to the upper chamber and back again.

12 Claims, 3 Drawing Figures

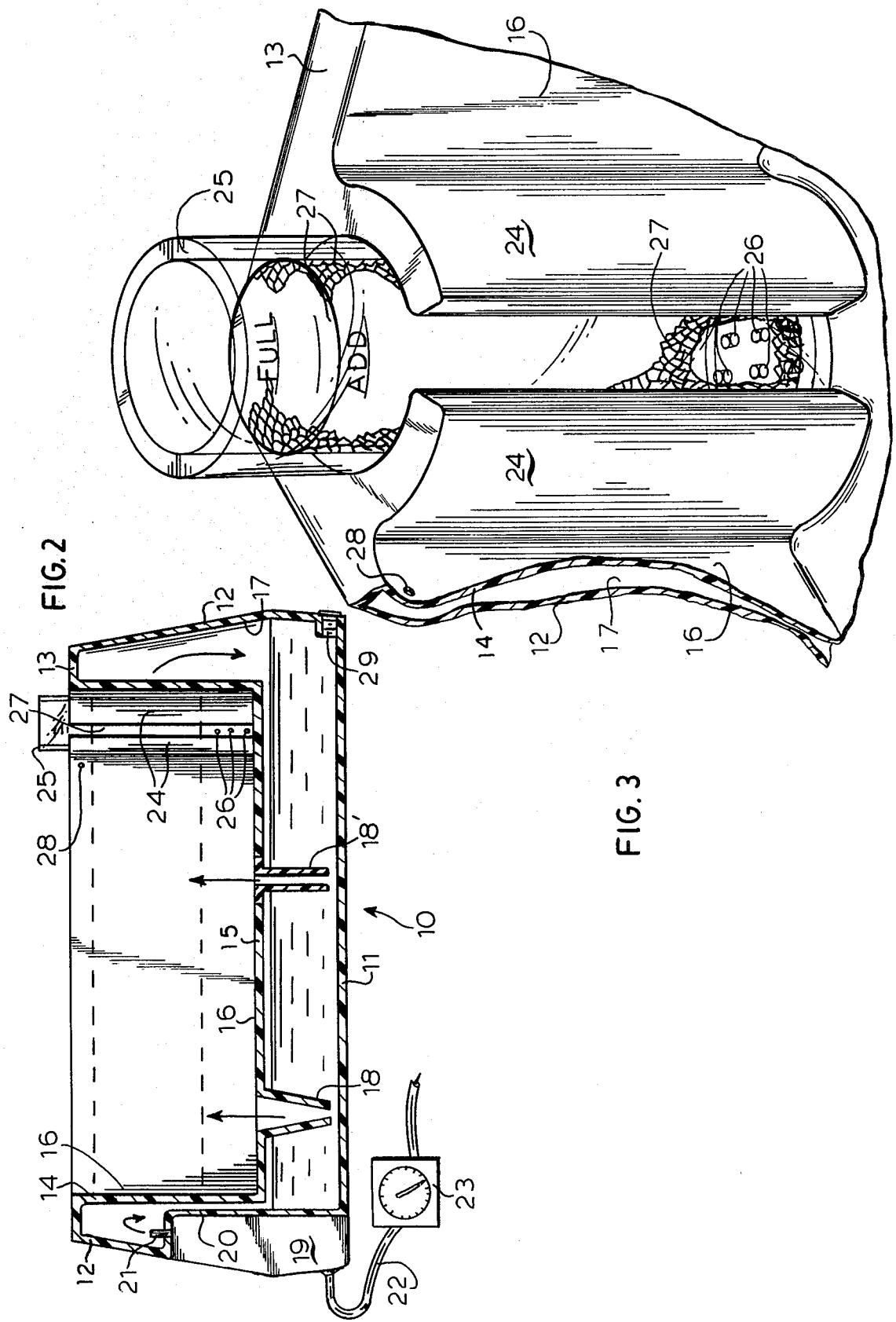

HYDROPONIC PLANTER

The present invention relates to a hydroponic device. More specifically, it relates to a hydroponic planter having an automatic irrigation and nutrient supply system.

Hydroponic gardening systems for various types of plants and vegetation are well known and widely used (see, for example, U.S. Pat. Nos.: 4,037,362; 4,048,753; 4,106,235; 4,118,891, and 4,133,141). Generally, however, such hydroponic units have not received wide favor because of problems in providing the plants and/or vegetation with sufficient nutrient solution to obtain adequate growth.

While attempts have been made to improve upon these problems and to provide automatic and continuous irrigation and nutrient supply systems (see, for example, U.S. Pat. No. 4,189,867), difficulties have remained. For example, a variety of tubes and clamps are typically required for feeding the nutrient solution to the plants which render the devices aesthetically unpleasing, as well as increasing the manufacturing and production costs considerably. Others are bulky and cumbersome to use. Some require many parts, some of which must often be welded together. Moreover, most do not afford a simple, effective supply means for supplying the growing medium with a continuous and adequate supply of the nutrient solution.

It is therefore an object of the present invention to provide a compact and fully automatic hydroponic planter which eliminates the above-noted problems.

It is a further object of the invention to provide such a hydroponic planter which is relatively simple in construction, easy to use and dependable in operation.

It is a more particular object of the present invention to provide a novel hydroponic planter having the foregoing attributes and characterisics which is aesthetically pleasing.

Certain of the foregoing and related objects are readily attained in a hydroponic device which includes a hollow housing having a partition wall separating a substantially closed lower chamber which serves to hold the nutrient solution and a top open-ended upper chamber which serves to hold the inert filler material and the plants or other vegetation, and at least one nutrient supply pipe coupled to the partition wall and extending downwardly into the lower chamber. The supply pipe has a bore extending therethrough to establish fluid communicating between the upper chamber and the lower chamber.

Preferably, the device additionally includes inlet means in the housing for introducing air into the lower chamber and an air pump coupled to the inlet means for pumping air into the lower chamber via the inlet means. The excess air pressure generated in the lower chamber serves to displace the nutrient supply solution and force it through the supply pipe into the upper chamber. Most advantageously, the device also includes a timer for activating and deactivating the air pump, the timer being coupled to the air pump.

In a preferred embodiment of the invention, means for monitoring the fluid level in the upper chamber is provided. Most desirably, the monitoring means includes an upright, transparent float support tube mounted in the upper chamber and a float slidably mounted in the support tube for up-and-down movement relative to the liquid level in the upper chamber.

In a particularly preferred embodiment of the invention, the housing comprises a generally horizontally-disposed lower chamber base wall, an upstanding outer sidewall joined at its lower end to the periphery of the lower chamber base wall, a generally horizontally-disposed, upper chamber base wall spaced above the lower chamber base wall which serves as the "partition wall", an upstanding inner sidewall joined at its lower end to the periphery of the upper chamber base wall, and a generally horizontally-disposed top wall joined to the upper ends of said outer and inner sidewalls. The housing is advantageously integrally-formed and made from a suitable, conventional synthetic resin material.

It is also especially advantageous to provide a vent hole in the inner sidewall to prevent an excess pressure build-up in the lower chamber and a drainage plug releasably mounted in the outer sidewall for draining the liquid from the lower chamber.

In an especially preferred embodiment, a plurality of the feed pipes are provided. These feed pipes are preferably cylindrical or downwardly-tapered.

Other features and objects of the present invention will become apparent from the following detailed description considered in connection with the accompanying drawings, which discloses one embodiment of the invention. It is to be understood that the drawings are to be used for the purposes of illustration only, and not as a definition of the limits of the invention.

In the drawings, wherein similar reference characters denote similar elements throughout the several views:

FIG. 2 is a sectional view taken along 2—2 of FIG. 1; and

FIG. 3 is an enlarged, fragmentarily-illustrated, perspective view of the float mechanism of the planter.

Figure 1:
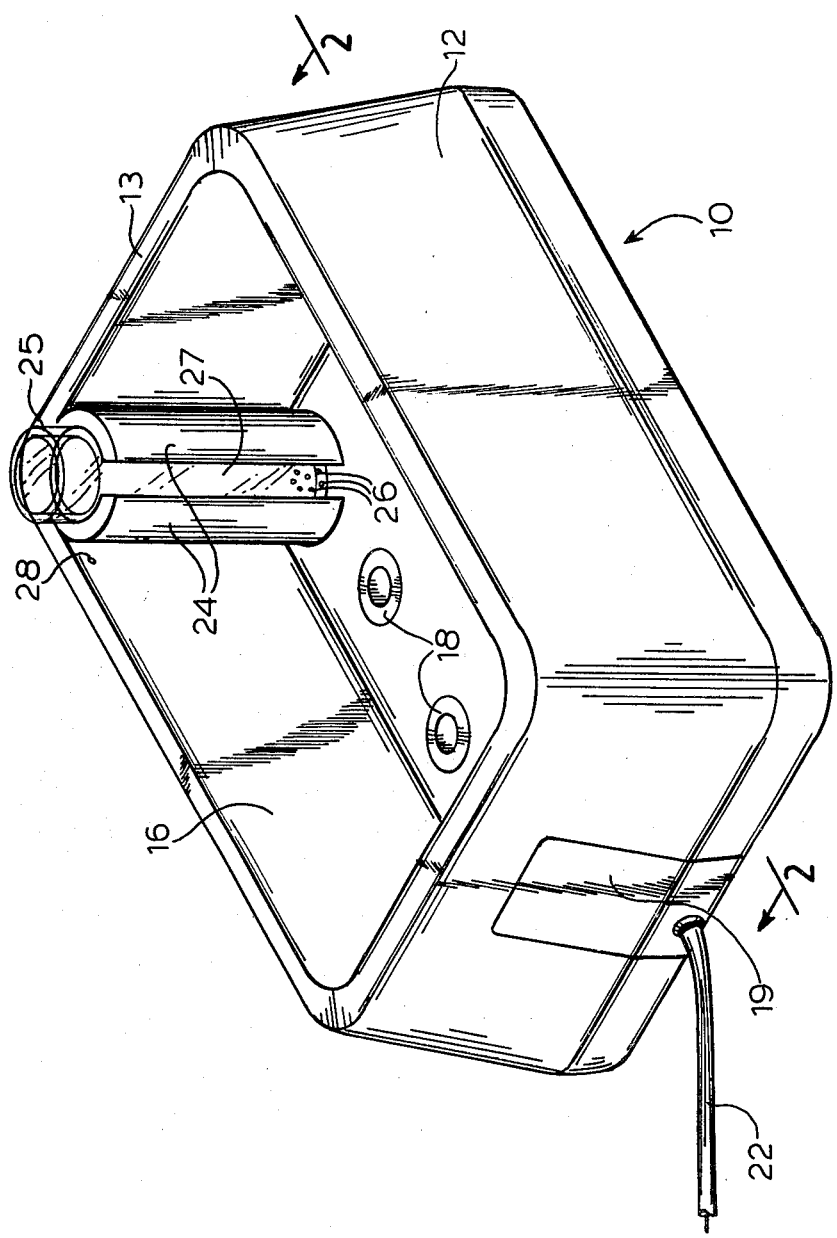
FIG. 1 is a perspective view of a novel hydroponic planter embodying the present invention.

Referring now in detail to the appended drawings and, in particular, FIGS. 1 and 2 thereof, therein illustrated is a novel hydroponic planter embodying the present invention which includes a one piece, double-walled, integrally-molded housing 10 made of plastic. Housing 10 has a generally rectangular configuration and, as best seen in FIG. 2, is composed of a flat base wall 11, an upstanding outer sidewall 12, a horizontally-disposed top rim or wall 13, an inner sidewall 14 and a partition wall or upper chamber base wall 15. Inner sidewall 14 and base wall 15 define a chamber 16 having a top open end to which an inert filler material, such as rocks or pebbles, (not shown) is added to serve as the support for the root system of the plant or other vegetation to be grown in the planter. The outer walls 11, 12, 13, and the inner walls 14 and 15 define therebetween a substantially closed interior or lower chamber 17, which normally contains the conventional nutrient solution or other growth medium in solution.

Upper chamber base wall 15 is provided with a plurality of downwardly-tapered and directed nutrient supply or feed pipes 18 to allow for the feeding of the nutrient solution from bottom chamber 17 to top chamber 16. Pipes 18 may be integrally molded with the housing 10 or separate pipe inserts 18' may be provided, which may be, e.g., cylindrical. In order to effect the transfer of the nutrient solution from the lower chamber 17 to the upper chamber 16, a pump 19 is provided which is inserted in a recessed section 20 of a sidewall 12 and is contoured such that its outer surface blends in with the contour of outer wall 12. Pump 19 is provided with an outlet tube 21 which extends through sidewall 12 into the upper portion of lower chamber 17. Pump 19 is, in turn, connected, via line 22, to a conventional timer 23 which may be programmed for cyclical operation, as desired.

Upon operation of pump 19, an excess or build-up of air pressure in chamber 17 above the nutrient solution will be generated, and this will force the nutrient solution up through feed pipes 18, 18' and into the upper chamber 16 (see arrows in FIG. 2), as long as the pump operation is maintained. Upon turning off the pump, the nutrient solution may then slowly drain from the upper chamber 16 back to the lower chamber 17 via pipes 18. As can be appreciated, by selecting a suitable time cycle for activating and deactivating the pump via timer 23, a constant nutrient supply may be provided for the root system of the plants.

To assist the user in determining whether or not sufficient nutrient solution is being supplied to the plants, a float mechanism may be provided such as is shown in FIG. 3. The float mechanism is mounted in the corner of the upper chamber 16 between a pair of arcuate, sleeve-like flanges 24 which define therebetween a generally cylindrical channel in which a transparent, cylindrical float support 25 is mounted. An expanded or foamed plastic float member 27 is, in turn, mounted in float support 25 which is intended to move up and down relative to the nutrient solution level in the upper chamber 16. A multiplicity of holes 26 is provided in the base of float support 25 to allow for the introduction and withdrawal of the nutrient solution thereinto and therefrom, respectively, the change in level of which will cause the float 27 to rise and fall therewith. The upper portion of the float support 25 extends above the top wall 13 and is provided with graduated markings or lines to indicate whether the upper chamber 17 is full, at an adequate sufficient level, or whether additional nutrient solution is needed.

It should be noted that float support 25 and holes 26 are necessary to prevent the inert filler material from clogging the channel defined by flanges 24. However, instead of holes 26, tube 25 could be, e.g., simply raised slightly from the base wall 15 to establish fluid communication between the float channel and the remainder of the upper chamber 16.

As can be seen in the upper portion of the inner sidewall 14, at least one vent hole 28 is provided which serves as a pressure release valve in case there is too great a build-up of pressure within lower chamber 17. The same can also serve as an overflow safety valve in case the nutrient level should rise to too great an extent in the upper chamber 16.

As further shown in FIG. 2, a drain plug 29 is provided to allow for the draining of the nutrient solution in case one wants to change the same. If desired, molded-in feet or handles may be provided for base wall 11 and sidewall 12, although such is not shown in the drawings.

The configuration, number and spacing of the feed pipes 18 may, of course, be modified as desired. It should also be noted that the diameter and size of the supply pipes shown in FIGS. 1 and 2 are exaggerated for the purposes of illustration only, and typically they will have a much smaller throughput capacity so as to ensure that the nutrient solution will drain from the upper chamber rather slowly.

Preferably, the ratio of the upper chamber to the lower chamber is maintained in a relationship such that volume of the upper chamber is maximized for growing vegetation and the volume of the lower chamber is maximized for providing adequate fluid to the upper chamber, less inert filler material. Thus, the total volume of the device should equal the volume of the upper chamber plus the volume of the lower chamber, the latter of which should preferably equal the volume of the upper chamber minus the volume of the inert filler.

It should also be realized that the maximum height of the fluid in the lower chamber should not exceed the level of the base wall 16 of the upper chamber since this would not allow for a complete draining of the upper chamber. As can also be realized, the height of the container will be a function of the pressure capabilities of the air pump. This relation may preferably be expressed as follows:

$$\text{Maximum Height } H_{(m)} = \frac{P_{(pump)} - 14.7}{0.3613}$$

As can be appreciated, various other modifications and changes may be made as will be apparent to those skilled in the art. For example, the container may preferably be either injection-molded or rotationally-molded as a one-piece plastic unit. However, the size and shape can be of any desired configuration or dimensions and the same, as well as the various parts thereof, can be made in other suitable materials other than conventional synthetic plastics, e.g., such as metal or ceramic materials, or combinations of materials.

As can also be appreciated, the thickness of the wall sections may be minimized as a function of internal pressure, container geometry and container size. If necessary, additional vent holes 28 may be drilled to enable air to enter into and escape from the lower chamber; e.g., when air enters, water fills the upper chamber, and when the pump shuts off, air escapes thus allowing water to fill the lower chamber. The air vent hole is drilled to a certain control diameter, above the desired full water mark such that excessive air loss will not be realized during the filling cycle.

Thus, where only one embodiment of the present invention has been shown and described, it is obvious that many changes and modifications may be made thereunto without departing from the spirit and scope of the invention.

What is claimed is:
1. A hydroponic device, comprising:
a hollow, integrally-formed, one-piece housing having a partition wall separating a substantially closed pressurizable lower chamber which serves to receive a liquid nutrient supply and an upper chamber having a top open end which serves to receive an inert filler material and the desired vegetation, said housing comprising a generally horizontally-disposed lower chamber base wall, an upstanding outer sidewall joined at its lower end to the periphery of said lower chamber base wall, a generally horizontally-disposed upper chamber base wall spaced above said lower chamber base wall which serves as said partition wall, an upstanding inner sidewall joined at its lower end to the periphery of said upper chamber base wall and a generally horizontally-disposed top wall joined to the upper ends of said outer and inner sidewalls, said outer sidewall having a recessed section formed therein defined in part by a generally horizontally-disposed, inwardly-extending ledge:

at least one nutrient supply pipe coupled to said partition wall and extending downwardly into said lower chamber, said supply pipe having a bore extending therethrough to establish fluid communication between said upper chamber and said lower chamber;

inlet means in said housing ledge for introducing air under pressure into said lower chamber;

an electrically-powered air pump mounted in said recessed section of said housing so that its exposed external surface is substantially flush with the exposed outer surface of said outer sidewall, said air pump being coupled to said inlet means for pumping air into said lower chamber via said inlet means;

drainage means mounted in housing for draining liquid from said lower chamber; and vent means for releasing a pressure build-up within said lower chamber.

2. The device according to claim 1, additionally including a timer for activating and deactivating said air pump, said timer being coupled to said air pump.

3. The device according to claim 1, additionally including means for monitoring the fluid level in said upper chamber.

4. The device according to claim 3, wherein said monitoring means includes an upper transparent float support tube mounted in said upper chamber and a float slidably mounted in said support tube for up-and-down movement relative to the liquid level in said upper chamber.

5. The device according to claim 1, wherein said vent means comprises a vent hole in said inner sidewall.

6. The device according to claim 1, wherein said drainage means comprises a drainage plug releasably mounted in said outer sidewall.

7. The device according to claim 1, including a plurality of said feed pipes.

8. The device according to claim 1, wherein said feed pipes are cylindrical.

9. The device according to claim 1, wherein said feed pipes are downwardly-tapered.

10. A hydroponic device, comprising:

a hollow, integrally-formed, one-piece housing having a partition wall separating a substantially closed pressurizable lower chamber which serves to receive a liquid nutrient supply and an upper chamber having a top open end which serves to receive an inert filler material and the desired vegetation, said housing comprising a generally horizontally-disposed lower chamber base wall, an upstanding outer sidewall joined at its lower end to the periphery of said lower chamber base wall, a generally horizontally-disposed upper chamber base wall spaced above said lower chamber base wall which serves as said partition wall, an upstanding inner sidewall joined at its lower end to the periphery of said upper chamber base wall and a generally horizontally-disposed top wall joined to the upper ends of said outer and inner sidewalls;

at least one nutrient supply pipe coupled to said partition wall and extending downwardly into said lower chamber, said supply pipe having a bore extending therethrough to establish fluid communication between said upper chamber and said lower chamber;

inlet means in said housing for introducing air under pressure into said lower chamber;

an electrically-powered air pump mounted in said housing and coupled to said inlet means for pumping air into said lower chamber via said inlet means;

drainage means mounted in said outer sidewall for draining liquid from said lower chamber; and vent means disposed in said inner sidewall for releasing a pressure build-up within said lower chamber and also serving as an overflow safety valve so as to return to the liquid nutrient supply to the lower chamber if it rises in the upper chamber above a predetermined level.

11. The device according to claim 1, wherein said housing is made of rotationally-molded plastic.

12. The device according to claim 1, wherein said housing is made of injection-molded plastic.

* * * * *